United States Patent

[11] 3,564,153

[72] Inventor Leonard E. Kronfeld
5200 Circle Downs, Minneapolis, Minn. 55416
[21] Appl. No. 766,148
[22] Filed Oct. 9, 1968
[45] Patented Feb. 16, 1971

[54] MAGNETIC TRANSDUCER WITH OPPOSITELY ORIENTED HEADS AND TWO CORE HOLDERS
15 Claims, 7 Drawing Figs.

[52] U.S. Cl. .......... 179/100.2
[51] Int. Cl. .......... G11b 5/26, G11b 5/28, G11b 21/16
[50] Field of Search .......... 179/100.2C; 340/174.1 (F); 346/74 (MC); 29/603

[56] References Cited

UNITED STATES PATENTS

| | | | |
|---|---|---|---|
| 3,211,843 | 10/1965 | Dundovic | 179/100.2 |
| 2,803,708 | 8/1957 | Camras | 179/100.2 |
| 2,793,253 | 5/1957 | Howey | 179/100.2 |

*Primary Examiner*—Bernard Konick
*Assistant Examiner*—Robert S. Tupper
*Attorney*—Merchant and Gould ABSTRACT: A magnetic transducer having two oppositely oriented, spaced stereo heads, each head having a pair of magnetic circuits capable of alternatively erasing and recording or playing back signals on a magnetic tape. Each circuit includes a pair of oppositely disposed generally U-shaped core pieces and a common center leg core piece. Erase and recording gaps are provided for each circuit between the core tips of the U-shaped core pieces and the top portion of the center leg core piece. The four recording gaps for the transducer all lie in a single plane extending transversely through both heads. The center leg core piece for one stereo head thus lie on one side of the plane while the center leg core pieces for the other stereo head lie on the other side of the plane. The transducer is split along the plane with all structure on one side thereof mounted in a first core holder and all structure on the other side thereof mounted in a second core holder. The two core holders and the structures carried by each are thus identical.

INVENTOR.
LEONARD E. KRONFELD
BY
Merchant & Gould
ATTORNEYS

INVENTOR.
LEONARD E. KRONFELD
BY
Merchant & Gould
ATTORNEYS

MAGNETIC TRANSDUCER WITH OPPOSITELY ORIENTED HEADS AND TWO CORE HOLDERS

BACKGROUND OF THE INVENTION

1. Field of the Invention

This invention relates generally to magnetic transducers, and more particularly relates to the novel structural features of a transducer having two pair of oppositely oriented stereo heads capable of either erasing and recording or playing back signals on a magnetic tape.

2. Description of the Prior Art

Many tape recorders today utilize cartridges or cassettes to carry the magnetic tape in order to minimize handling and threading problems. In one typical type of prior art recorder, the tape is carried by a spool in one cartridge and is transferred to an empty spool in another cartridge during use of the recorder. A transducer having a single mono or stereo head is provided that will erase and record or play back signals on a track or tracks located along one edge portion of the tape face. After the tape has been completely transferred to the empty spool during use of the recorder, the cartridges are interchanged so that another track or tracks located along the other edge portion of the tape face can be utilized. Although such a system is more reliable than the older systems employing open spools and manual threading, some problems with tape breakage and snarling still exist.

Another prior art system, of which I am aware, utilizes a single cassette in which two spools are mounted. The magnetic tape is permanently mounted on the spools in the cassette and is transferable in either direction between the spools simply by rotating them in the proper direction. Small openings are provided along one edge of the cassette to provide access to the face of the tape. In these systems, the cassette is physically removed from the recorder and turned over after one set of tracks has been used, so that the other set of tracks can be used.

I am also aware that another approach to utilizing these cassettes has recently been developed, which approach may or may not be prior art with respect to the present invention. In this approach, a four-channel record head and two separate erase heads are used. When two channels have been completely recorded by completely transferring the tape in one direction, the spools in the cassette are rotated in the opposite direction to record the other two channels. One of the erase heads and two channels on the record head are used to record in one direction. The other erase head and the other two channels on the record head are used to record in the other direction. Thus, the two erase heads are positioned on opposite sides of the record head, each one being in line with the appropriate pair of channels on the tape. In this type of system, the cassette need not be removed from the tape recorder and turned over in order to record both sets of channels on the tape.

A basic problem with this approach, however, is proper alignment. Since three separate heads are used, three separate alignment operations are required in order to insure proper erasing and recording in each direction.

One head construction that can be utilized with cassette type recorders is shown in the Paul S. Michael patent application, Ser. No. 731,395 that was filed May 23, 1968 in the United States Patent Office. The Michael application discloses a dual track head capable of either erasing and recording or playing back signals on two tracks of a tape moving past the head in one direction. If used with a tape cassette having two spools, the tape cassette would have to be removed and turned over after two tracks are recorded, in order to utilize the other two tracks on a tape face.

SUMMARY OF THE INVENTION

The present invention provides, in a single housing, two stereo heads each capable of erasing and recording or playing back signals on two tracks of a magnetic tape. The two heads are spaced from each other and are oppositely oriented so that one head can be used to record one pair of tracks with the tape moving in one direction, and the other head to record another pair of tracks with the tape moving in the other direction. Thus, with the transducer of the present invention, neither the cassette nor the transducer need be physically moved to record both sets of tracks on the tape. After one set of tracks is recorded by one of the heads, the direction of rotation of the spools in the cassette is reversed and the other set of tracks is recorded by the other head with the tape moving in the opposite direction. Since both of the heads are mounted in a single housing, only one alignment operation is required to accurately align all the erase gaps and recording/playback gaps with the tape. With this system, tape handling is reduced to an absolute minimum since the only handling of the cassette occurs at the initial insertion in the tape recorder and at the final removal therefrom. This new transducer also makes feasible automatic cassette changer mechanisms.

The construction of the magnetic circuit for each track of the present head is somewhat similar to that shown in the previously mentioned Michael application. In both cases the magnetic circuit for each track includes a pair of oppositely disposed generally U-shaped outer leg core pieces having a common center leg core piece mounted between them. The erase and record/playback gaps for each circuit are located on opposite sides of the top portion of the center leg core piece, between it and the core tips of the two U-shaped pieces.

The particular structure shown in the Michael application is not particularly well adapted for use in a bidirectional head, however, because of the manner in which the various magnetic elements are mounted in the transducer. In that structure, the U-shaped core pieces forming a major portion of the erase circuit are mounted in a first core holder, the U-shaped core pieces forming a major portion of the record/playback circuit are mounted in a second core holder, and the center leg core pieces are mounted in a center leg core holder. The ends of the U-shaped core pieces are flush with an open face of their respective core holders, and the opposite surfaces of the center leg core pieces are flush with the parallel faces of the center leg core holder. Before being joined together, the faces of the first and second core holders, and the opposing faces of the center leg core holder are ground and lapped to assure that each pair of faces to be joined together lie in a single plane. Suitable gap spacer means are provided on both sides of the center leg core pieces to form the erase and record/playback gaps. When the first and second core holders are placed on opposite sides of the center leg core holder, the complete magnetic circuit for each channel is formed, with the erase gaps lying in one transverse plane located on one side of the center leg core pieces, and the record/playback gaps lying in another plane on the other side of the center leg core pieces.

At first glance, it might appear that it would be relatively easy to add to the Michael structure an additional pair of oppositely oriented magnetic circuits to arrive at a structure functionally similar to the present invention. Some major problems occur, however, if an attempt is made to so modify the Michael structure.

Let us assume that the core holders are enlarged to accommodate another pair of magnetic circuits, and that the location of the two types of U-shaped core pieces are reversed with respect to the center leg core pieces. Then, the erase gaps for the second head will lie in the same plane as the record/playback gaps of the first head, and the record/playback gaps of the second head will lie in the same plane as the erase gaps of the first head. The two heads would thus be oppositely oriented as far as their erasing and recording capabilities are concerned. The problem with such a system however, it that it would be virtually impossible to achieve correct gap lengths. The two erase gaps are much longer than the record/playback gaps so that the gap lengths of all the gaps in both planes would be effectively determined by the erase gaps. The two record/playback gaps in each plane would thus be much too long. Therefore, without drastically changing the entire mounting arrangement, the correct gap lengths cannot be achieved with such a structure.

The present invention overcomes this problem by providing a unique mounting arrangement in which only two core holders are used, and in which the center leg core pieces are also mounted in the two core holders. The two core holders of the present invention and the structure carried by them are identical so that when the two core holders are placed in a face-to-face relationship, the complete magnetic circuits for the two oppositely oriented stereo heads are completed. Each core holder of the present invention carries a first two U-shaped core pieces forming a major portion of the record/playback circuit with the ends thereof lying in the plane of the core holder face. A second two U-shaped core pieces forming a major portion of the erase circuit are also carried by the core holder, but the ends thereof terminate a predetermined distance below the plane of the face of the core holder. Two center leg core pieces are then mounted in each core holder directly in contact with the second two U-shaped core pieces, with the upper surfaces of the two center leg core pieces lying in the plane of the core holder face. A suitable gap spacer is mounted between each of the second pair of U-shaped core pieces and the associated center leg core piece to form an erase gap of the proper length. After the two core holders have been completely assembled, the faces thereof are ground and lapped to place them in a single plane. A suitable record/playback gap spacer means is deposited on one of the faces and then the two core holders are placed in a face-to-face relationship to form the four magnetic circuits. In this structure, all four of the record/playback gaps lie in a single plane. With this structure, only two grinding and lapping operations are required since only two core holders are used. Further, the gap spacing means for the record/playback gaps can be deposited in a single operation since all of the record/playback gaps lie in the same plane.

DESCRIPTION OF THE PREFERRED EMBODIMENT

Figures 1, 2:
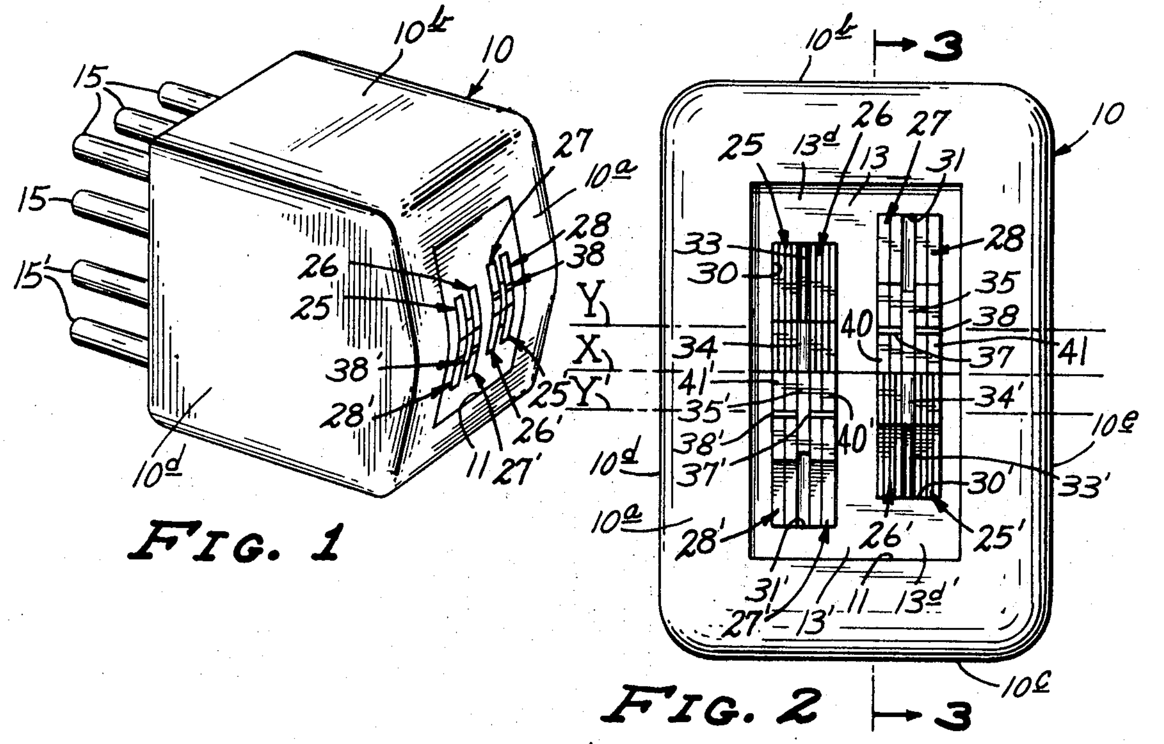
FIG. 1 is a perspective view, greatly enlarged, showing a magnetic transducer constructed according to my invention.
FIG. 2 is an enlarged elevational view of the tape engaging face of the transducer shown in FIG. 1, with the potting material utilized to position the assembled parts removed.

In the drawings, like numerals will be used throughout the several views to indicate like elements of the invention. The drawings disclose a magnetic transducer having a boxlike magnetic shield housing 10 having a curved tape-engaging face **10*a*, a pair of end walls 10*b* and 10*c*, a pair of sidewalls 10*d* and 10*e*, and an open bottom 10*f* disposed opposite the tape-engaging face 10*a*. Formed in tape-engaging face 10*a* is a generally rectangular opening 11 through which extend the tape-engaging portions of the magnetic circuits carried by housing 10**, to be more fully described later in this specification.

The present head structure is designed for alternatively erasing and recording or playing back signals on a magnetic tape. The transducer has two oppositely oriented, spaced stereo heads. Thus, two complete magnetic circuits are provided for each stereo head, each circuit being capable of performing the erase, recording and playback functions for one channel. The two magnetic circuits in one head provide these functions with the tape moving in one direction, while the two magnetic circuits in the other head provide these functions with the tap moving in the other direction. Each magnetic circuit is of the three-leg type, with the record/play and erase sections sharing a common center leg.

Referring again to the drawings, the electromagnetic elements are mounted in two core holders designated 13 and 13'. The two core holders 13 and 13' are of identical construction and each carries identical electromagnetic elements. Since the construction of the two core holders and the elements carried thereby are identical, one of them, core holder 13, will be described in detail. The other core holder 13' and the elements carried thereby will be identified by the same numeral designations together with the prime (') symbol notation.

Figures 4, 7:
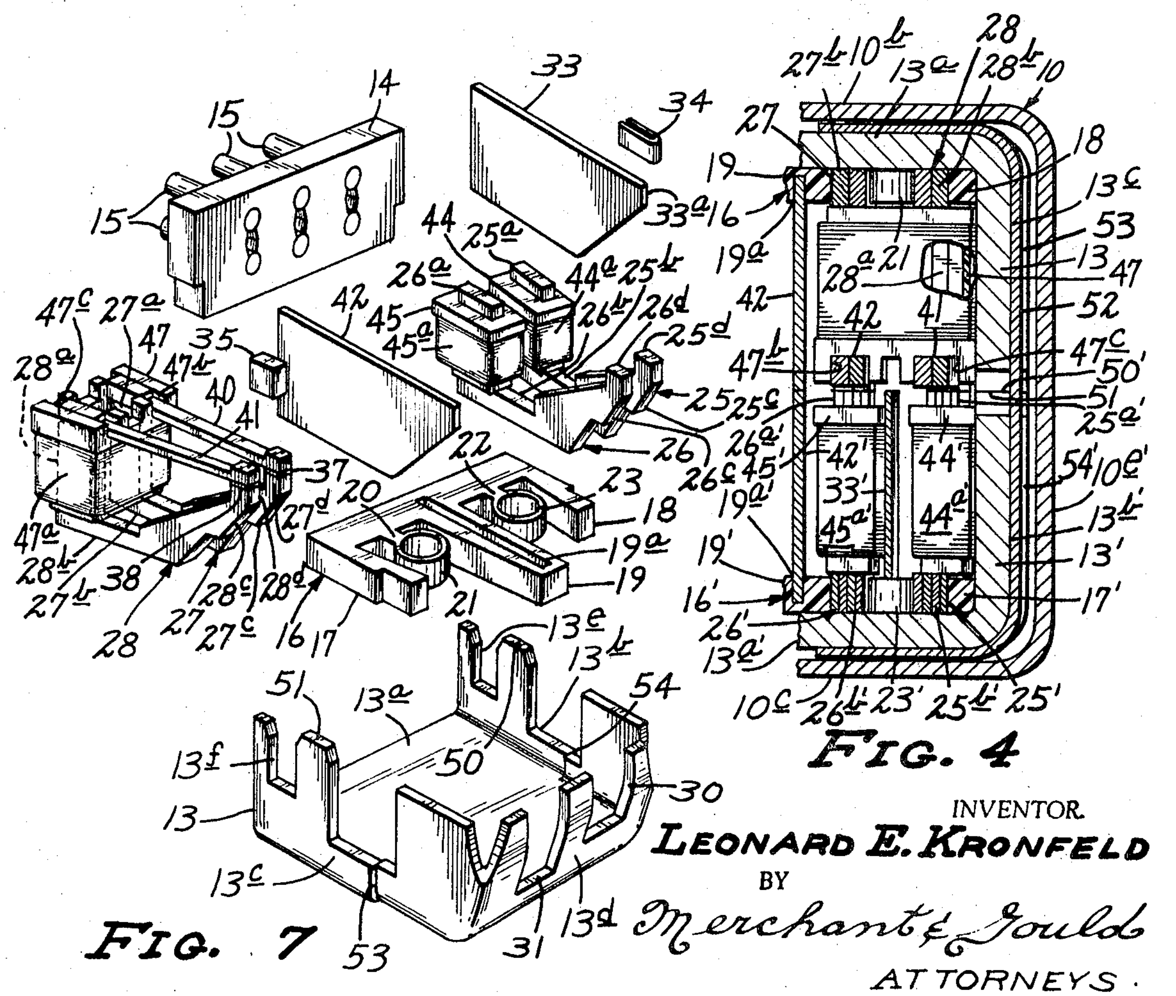
FIG. 4 is a sectional view taken along line 4–4 of FIG. 3.
FIG. 7 is an exploded perspective view of one core holder of the transducer and the structure carried thereby.

Referring to FIG. 7, core holder 13 includes a flat backwall portion **13*a*, a pair of opposite flat sidewall portions 13*b* and 13*c*, and a top wall portion 13*d* that extends upwardly and outwardly at a slight angle with respect to backwall portion 13*a*. The bottom of core holder 13 opposite top wall portion 13*d* is open and the front face of core holder 13 opposite backwall portion 13*a* is also open. Sidewall portions 13*b* and 13*c* are provided with a pair of slots 13*e* and 13*f*, respectively, adjacent the open bottom of core holder 13 in which is mounted a base member 14 made from an electrically insulating material. A plurality of electrical contact pins 15, in this case six in number, are mounted an base member 14 and extend downwardly from it and at right angles to it. Base member 14 itself is mounted perpendicular to both backwall portion 13*a* and sidewall portions 13*b* and 13*c***.

Adhesively secured to the inside of backwall portion **13*a*, and extending between sidewall portions 13*b* and 13*c*, is a flat core piece support member 16 having a pair of outside legs 17 and 18 extending in the same direction from the opposite ends thereof and a longer center leg 19 extending in the same direction from the center thereof. An open longitudinal slot 19*a* is formed in center leg 19. Support member 16 is preferably constructed as a single unit from a flexible plastic material. Extending from support member 16 midway between legs 17 and 19 is a short post 20 having a cylindrical spring member 21 formed on the top end thereof. The opening in cylindrical spring member 21 extends between the upper and lower surfaces of support member 16, and the outside diameter of spring member 21 is greater than the width of post 20. A pair of narrow channels are thus formed on opposite sides of post 20 and spring member 21, between them and the two legs 17 and 19. An identical post 22 and spring member 23 are located between legs 18 and 19** to form an identical pair of channels. The base leg portions of the various core pieces fit into these channels for support thereby as will later be described.

Four generally U-shaped outer leg core pieces 25, 26, 27 and 28 are mounted in core holder 13. Core pieces 25 and 26 form a major portion of the record/playback circuits for the pair of channels in one stereo head, and core pieces 27 and 28 form a major portion of the erase circuits for the pair of channels in the other stereo head of the transducer. Each of the U-shaped core pieces 25, 26, 27 and 28 that are mounted in core holder 13 comprise a base leg portion designated with the letter "*a*," a side leg portion designated with the letter "*b*," and a top leg portion designated with the letter "*c*," terminating in a core tip designated by the letter "*d*." Each of the four core pieces is mounted in core holder 13 with the side leg portion *b* thereof positioned within one of the narrow channels formed in support member 16 on opposite sides of the two spring members 21 and 23. The base leg *a* and top leg *c* portions of each core piece extend toward the open face of the core holder 13.

A first slot 30 and a second slot 31 are formed a predetermined distance apart in top wall portion **13*d* of core holder 13. Slots 30 and 31 extend downwardly from the edge of top wall portion 13*d* a predetermined distance toward backwall portion 13*a*. Both of the slots 30 and 31** have a predetermined width.

When the unit is assembled, support member 16 is adhesively secured to backwall portion **13*a*. Then, for example, core piece 25 is inserted in core holder 13 with side leg portion 25*b*** positioned within the narrow channel between spring member 23 and leg 18 of support member 16. Core piece 25 is slightly wider than the channel so that spring member 23 becomes slightly deformed when the core piece is inserted into the channel to thereby frictionally engage the core piece and hold it in the channel. The bottom edge of side leg portion 25*b* rests against the surface of flat backwall portion 13*a* to correctly position the core piece in a direction perpendicular to backwall portion 13*a*. The outside surface of side leg portion 25*a* lies in contact with the inside surface of leg 18 to assure the correct lateral positioning of core piece 25. With core piece 25 in this position, the top leg portion 25*c* extends into slot 30 with the outside surface thereof in contact with the edge of slot 30. Core piece 26 is then placed in the channel between spring member 23 and center leg 19 with its top leg portion 26*c* also extending into slot 30. Again, its correct positioning with respect to core holder 13 is achieved in the same manner as that described for core piece 25. In particular, one face of top leg portion 26*c* is positioned flush against the other edge of slot 30.

As previously mentioned, core holder 13 can be considered to have an open face defined by the edges of sidewall portions 13*b* and 13*c*, and the edge of top wall portion 13*d*. At least certain portions of these edges are constructed so as to lie in a single first plane, indicated in FIG. 2 by the center line X. U-shaped core pieces 25 and 26 are also constructed such that when they are mounted in core holder 13 as previously described, the ends of base leg portions 25*a* and 26*a* and the core tips 25*d* and 26*d* all lie in the same first plane X, except for inaccuracies corrected later by grinding and lapping.

Spacing means are also mounted between core pieces 25 and 26 to assist in spacing the core tips a predetermined distance apart and to prevent crosstalk between channels. These spacing means include a flat, magnetically permeable shield 33 that extends between the two spaced core pieces 25 and 26 to prevent crosstalk between channels. At least a corner portion 33*a* of shield 33 extends between top leg portions 25*c* and 26*c* which are positioned in slot 30. Since shield 33 is preferably less thick than the distance between the top leg portions of the core pieces when they are mounted in slot 30, a nonmagnetic foil member 34 is positioned around the corner portion 33*a* with the two ends thereof lying along the opposite surfaces of corner portion 33*a*. This double thickness of foil member 34, together with the single thickness of shield 33 is selected such that when they are inserted between top leg portions 25*c* and 26*c*, the top leg portions are forced tightly against the opposite side edges of slot 30. The two opposite side edges of slot 30 are spaced such that when the top leg portions are forced against them, the outside edges of the core tips will be spaced apart a distance equal to the distance between the outer edges of the two adjacent tracks of the tape. Thus, slot 30 effectively determines the spacing of the two core tips 25*d* and 26*d*. Foil member 34 is tightly wedged between each of the core pieces and the shield 33 to assure that no lateral shifting of the core tips can occur. Since foil member 34 is made from a nonmagnetic material, no interaction between the two adjacent core pieces can occur when the circuits are energized.

Referring now to the two generally U-shaped core pieces 27 and 28 which form major portions of the erase circuits for one head, it can be seen from the drawings that they are positioned within their respective channels in support member 16 in the same manner as heretofore described for core pieces 25 and 26. In this case, top leg portions 27*c* and 28*c* extend into slot 31 with the outside faces thereof lying against the opposite side edges of slot 31. Again, the opposite side edges of slot 31 determine the spacing of the core tips 27*d* and 28*d*. A generally rectangular nonmagnetic shim 35 is mounted between top leg portions 27*c* and 28*c* to force them against the opposite side edges of slot 31. The thickness of shim 35 is such that a tight fit occurs to prevent any movement of top leg portions 27*c* and 28*c* within slot 31.

The second pair of core pieces 27 and 28 are constructed such that when they are mounted in core holder 13, the ends of their base leg portions 27*a* and 28*a*, and their core tips 27*d* and 28*d* all terminate in a second plane, indicated in FIG. 2 by center line Y, that lies in a predetermined distance below the first plane X previously identified. Suitable erase gap spacers 37 and 38 are mounted on core tips 27*d* and 28*d* respectively. Gap spacers 37 and 38 are preferably made from a strip of Mylar plastic of appropriate thickness, in this case approximately .003 inches.

A pair of center leg core pieces 40 and 41 are fixedly mounted in core holder 13. A top portion of each of the center leg core pieces 40 and 41 is positioned within the second slot 31 adjacent a corresponding core tip 27*d* or 28*d*. A bottom portion of each center leg core piece 40 and 41 is positioned against the end of the base leg portion 27*a* or 28*a*. Gap spacer 37 is mounted between the top portion of center leg core piece 40 and core tip 27*d* to form an erase gap of correct length between them. Gap spacer 38 is mounted between the top portion of center leg core piece 41 and core tip 28*d* to form an erase gap of proper length for the other channel. The opposing outer surfaces of center leg core pieces 40 and 41 also lie against the opposite edges of slot 31, and shim 35 is wedged between them to hold them in place. As previously mentioned, the bottom portions of the two center leg core pieces 40 and 41 abut the ends of the base leg portions of the two core pieces 27 and 28. Two complete magnetic erase circuits are thus formed, providing the erase functions for one stereo head of the transducer.

The upper surfaces of at least the top and bottom portions of each of the center leg core pieces 40 and 41 lie in the first plane X which defines the face of core holder 13. Thus, the upper surfaces of center leg core pieces 40 and 41 lie in the same plane as the ends of base leg portions 25*a* and 26*a* and core tips 25*d* and 26*d*.

A generally flat, magnetically permeable shield 42 is mounted in core holder 13 between the first pair of core pieces 25, 26 and the second pair of core pieces 27, 28 to prevent interference between the two stereo heads. The bottom edge of shield 42 extends into slot 19*a* in support member 16 to hold it in position. The top edges of both shields 33 and 42 terminate in the first plane X of the face of core holder 13.

Figure 3:
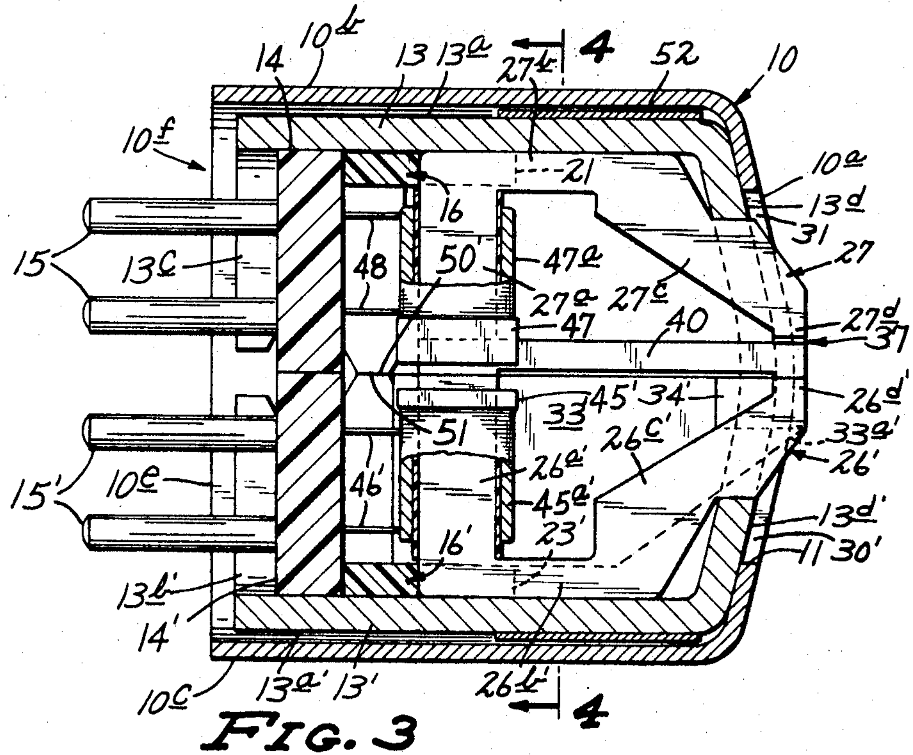
FIG. 3 is a sectional view taken along line 3–3 of FIG. 2.

Mounted on base leg portion 25*a* is a bobbin 44 carrying a coil of wire 44*a*. Mounted on base leg portion 26*a* is a similar bobbin 45 carrying a similar coil of wire 45*a*. Both of the generally U-shaped core pieces in the record/playback sections thus carry a coil horizontally mounted on a base leg thereof. As best shown in FIG. 3, a pair of wires such as pair 46′ extend from each coil 44*a*′ and 45*a*′ to a corresponding pair of pins 15′.

Figures 5, 6:
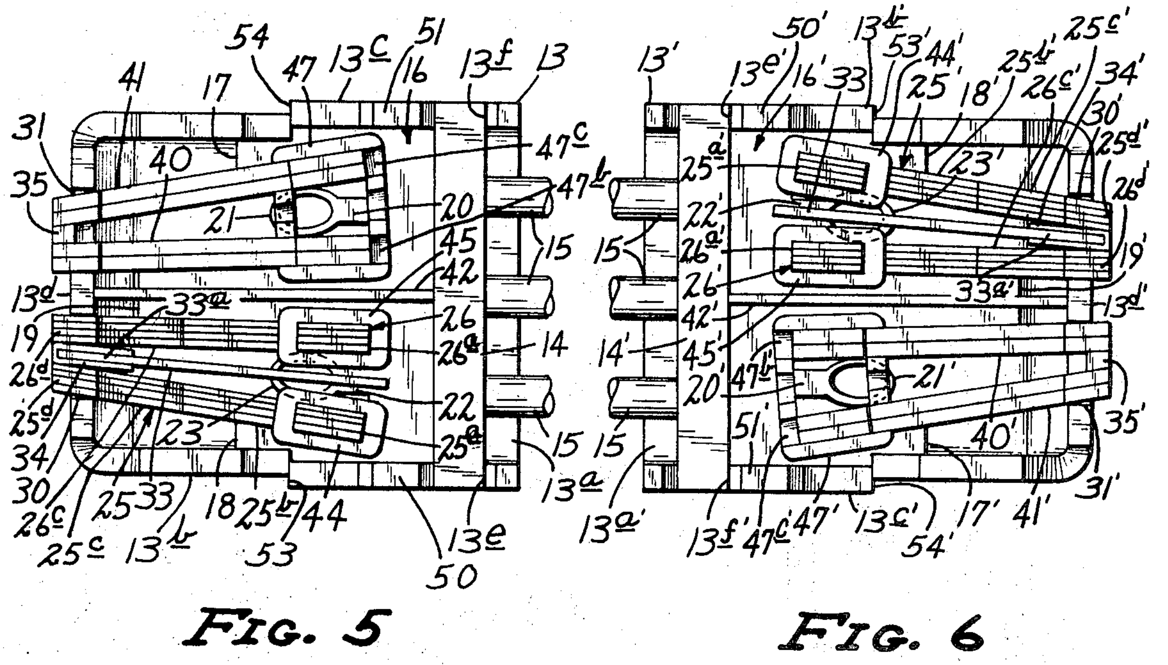
FIGS. 5 and 6 are elevational views of the adjoining faces of the core holders and the assembled parts associated therewith.

A single bobbin 47 is mounted around the two base leg portions 27*a* and 28*a* of the erase section and carries a single coil of wire 47*a*. A pair of wires 48, as shown in FIG. 3, extend from coil 47*a* to an associated pair of pins 15. Thus, a single erase coil 47*a* is used to provide erase flux for both erase circuits in each stereo head. As best shown in FIGS. 5 and 6, bobbin 47 has a single center opening through which extend the base leg portions 27*a* and 28*a*. The upper peripheral edge of bobbin 47 is provided with a pair of slots 47*b* and 47*c* that are aligned with the upper ends of the two base leg portions 27*a* and 28 *a*. Each of the slots 47*b* and 47*c* is of the same width as the width of the associated center leg core pieces 40 and 41, so that the bottom portion of center leg core piece 40 lies in slot 47*b* while the bottom portion of center leg core piece 41 lies in slot 47*c*. The two slots prevent lateral shifting of the two center leg core pieces.

As best shown in FIGS. 5 and 6, the base leg portions of each pair of core pieces are spaced further apart than the corresponding top leg portions and corresponding core tips. This wider spacing of the base leg portions of the two record/playback core pieces 25 and 26 is necessary since a separate coil is mounted on each base leg portion and the two core pieces are separated by a shield 33. It is then necessary to position the core pieces forming the erase circuit in the same manner since when the two core holders 13 and 13' are placed in a face-to-face relationship, the first pair of core pieces in one core holder must line up with the second pair of core pieces in the other core holder to form a complete pair of magnetic circuits for one stereo head. It also follows that the various channels in support member 16 and the two slots 47*b* and 47*c* are formed at the proper angles to reflect this particular spacing or positioning of the core pieces.

Before discussing in more detail the final assembly of the preferred embodiment of the present invention, it is again noted that the magnetic transducer of the present invention has two oppositely oriented, spaced stereo heads, each head having a pair of magnetic circuits capable of alternatively erasing and recording or playing back signals on a magnetic tape. In essence, two oppositely oriented stereo heads are provided in a single transducer. Returning to the structure of the two core holders, it is noted again that the assembled core holders 13 and 13' are identical to each other. Therefore, each contains a first pair of generally U-shaped core pieces forming a major portion of the record/playback circuits for one stereo head of the transducer. Each core holder also carries a second pair of generally U-shaped core pieces together with a pair of center leg core pieces, which assembly forms the erase circuits for one stereo head. Neither of the stereo heads is complete, however, until the two core holders 13 and 13' are placed in a face-to-face relationship to properly align the associated magnetic circuits.

Referring to FIGS. 5 and 6, the faces of the two assembled core holders 13 and 13' are shown. A brief examination of the two will reveal that they are identical in construction. When core holders 13 and 13' are placed in a face-to-face relationship, it can be seen that center leg core piece 41 will be directly in line with U-shaped core piece 25', center leg core piece 40 will be directly in line with U-shaped core piece 26', U-shaped core piece 26 will be directly in line with center leg core piece 40', and that U-shaped core piece 25 will be directly in line with center leg core piece 41'. The core tips 25*d*' and 26*d*' will abut the upper surfaces of the top portions of center leg core pieces 40 and 41 since they all lie in the same plane X when the two core holders are placed in a face-to-face relationship. In like manner, the ends of base leg portions 25*a*' and 26*a*' will abut the upper surfaces of the bottom portions of center leg core pieces 41 and 40. When the two core holders 13 and 13', as shown in FIGS. 5 and 6, are joined together, they form two complete stereo heads each having two complete magnetic circuits. Each magnetic circuit is capable of alternatively erasing and recording or playing back signals on a magnetic tape.

When the two core holders 13 and 13' are placed together, all four recording gaps are positioned in the same first plane X defined by the faces of the core holders. This relationship of the recording gaps can be seen in FIG. 2. On the other hand, the erase gaps for one stereo head lie in a second plane Y, on one side of the first plane X, while the erase gaps for the second stereo head lie in a second plane Y' on the opposite side of the plane X. This relationship is very important because it permits bidirectional recording and because the length of the erase gaps does not influence the more critical length of the record/playback gaps. The erase gaps are formed by placing the Mylar gap spacers 37 and 38 between the core tips 27*d*, and 28*d* and the center leg core pieces 40 and 41, as previously described. Although each erase gap should be approximately .003 inches long, some variation in this can occur without adversely affecting the performance of the erase function. In actual practice, the length of the erase gap is much less critical than the length of the recording/playback gap. Therefore, in the present invention, the erase gaps are completely formed during assembly of the individual core holders and these spacings need not be changed or calibrated when the two core holders are assembled together to form the entire transducer. The length of each record/playback gap is quite critical, however, if accurate reproduction is to occur. The R/P gap is also much shorter, being approximately .000050 inches long. Since the length of the R/P is so much shorter and since it must be more accurately constructed, the construction of the present invention is unusually well suited to insure accurate R/P gap length. In the present invention, all of the R/P gaps lie in the same plane X. Therefore, prior to placing the two core holders 13 and 13' in a face-to-face relationship, suitable R/P gap spacers are mounted between the opposing core pieces forming the R/P gaps. In the preferred embodiment of the present invention the R/P gap spacers are deposited on the face of one of the two core holders, or both, by sputtering or the like. A very thin film of accurate thickness is thus formed on the core tips and the top portions of the center leg core pieces of one core holder, or both, before the two core holders are joined together.

In order for the transducer to operate properly, all of the core pieces must be correctly aligned when the two core holders are inserted in housing 10. The first step in obtaining this correct alignment is to make sure that both of the core holders will position their associated sets of core pieces in the correct position. This is achieved by adhesively securing the individual core pieces in their various mounting slots and channels. After the electromagnetic elements have been securely and accurately mounted and bonded in their respective core holders, the next step is a grinding and lapping operation to make the adjoining faces of the two core holders completely coplanar. To facilitate this operation, the sidewall portions 13*b* and 13*c* are provided with a raised edge portion or lapping pad adjacent base member 14. The raised edge portion for sidewall portion 13*b* is designated by the numeral 50 while the raised edge portion for sidewall portion 13*c* is designated by the numeral 51. The top edge of the top wall portion 13*d* as well as the two raised edge portions 50 and 51 all lie in the same first plane X defining the open face of core holder 13. As previously described, certain portions of the various core pieces also lie in this same plane X. Since some inaccuracies will exist after assembly, however, all of the surfaces are ground and lapped a slight amount to place them all in the same plane X. This same grinding operation is applied to both of the core holders 13 and 13' and their associated assembled core pieces. When the two core holders are assembled into the housing as shown in FIG. 3, the raised edge portions such as 50' and 51 abut each other, the oppositely disposed core pieces abut each other and the edges of the two top wall portions 13*d* and 13*d*' abut each other. As previously mentioned, of course, before the two core holders are placed together, a suitable R/P gap spacer material is deposited on the face of one or both of the core holders.

It is noted that when the U-shaped core pieces are mounted in their respective core holders, the top leg portions thereof extend through the slots 30 and 31 as shown in FIGS. 5 and 6. The top portion of each center leg core piece also extends through the slot 31. When the two core holders 13 and 13' are placed together and inserted in housing 10, these protruding core pieces will extend upwardly through the opening 11 in the tape-engaging face 10*a* of the housing. Before the two core holders are inserted into housing 10, however, some means must be provided to prevent shifting between them and to clamp them together. The means employed in the present invention are a pair of spring clips, one of which is shown in FIGS. 3 and 4 and designated by the numeral 52. As best shown in FIG. 5, a pair of shoulders 53 and 54 are formed on the outsides of sidewall portions 13*b* and 13*c* and a similar pair of shoulders are formed on core holder 13'. Spring clip 52 thus extends around one side of the two adjoining core holders with the inner face thereof lying against the backwall portions and the adjoining sidewall portions of the two core holders. The bottom edge of spring clip 52 abuts against shoulders 53 and 54'. The opposite spring clip (not shown) abuts in the same manner against the other sides of the core holders. The two spring clips thus preventing shifting of the core holders. Although spring clips are used in the preferred embodiment shown here to position and hold the core holders together, other means such as screws could be used without departing from the present invention. Full details of the structure and use of spring clips of this type are given in the copending Leonard Kronfeld application, Ser. No. 580,981, that was filed Sept. 21, 1966.

After the two core holders have been assembled together, by means of the two spring clips, they are inserted into housing 10 so that the core tips and the top portions of the center leg core pieces extend through the opening 11. The unit is then potted by filling the interior cavity and all openings between the various elements with a thermo-setting plastic. After the plastic has hardened to secure all of the elements tightly together, the protruding core tips are ground off in line with the curve of the tape-engaging face 10*a* as shown in FIG. 1. At this point, the magnetic transducer is completely fabricated and ready for use.

The two stereo heads in the finished transducer are magnetically separated by the two shields 42 and 42'. The two shields 42 and 42' separate the two stereo heads and short out stray lines of flux to prevent interference between the heads. The particular shield configuration shown in the drawings is not critical since it is simply necessary that the shields be sufficiently large to block out interference between the two stereo heads. Similarly, the configuration of shields 33 and 33' could be changed without departing from the invention.

The operation of the electromagnetic elements for each channel of the transducer can best be seen with respect to FIG. 3. During recording, the erase coil 47*a* is energized to provide an erase flux that travels through core pieces 27 and 40 to provide an intense erase flux field at the erase gap 37. At the same time, R/P coil 45*a'* is energized to provide audio recording flux that travels through core pieces 26' and 40 to provide a recording flux field at the record gap formed between core tip 26*d'* and the top portion of center leg core piece 40. Also, in the present invention, the high frequency flux provided by the erase coil not only provides the necessary erase flux but also provides bias flux for the recording gap. With respect to erase coil 47*a* for example, the bias flux travels through core pieces 27, the ends of 40, and 26'. Therefore, in the present invention, it is not necessary to introduce bias into the R/PB coil directly with the audio signal. During playback, the signals generated by the tape moving past the R/PB gap, travel through core pieces 26' and 40 and are picked up by coil 45*a'*.

The concepts employed in constructing the preferred embodiment of the present invention shown in the drawings and described herein, can also be utilized in constructing many other types of magnetic transducers. For example, if a single stereo head is to be constructed, one core holder would carry the erase circuitry including the center leg core pieces while the other core holder would carry the two U-shaped core pieces forming a major portion of the R/P circuit. The two core holders would then be joined together in the manner previously described to form the complete stereo head. The basic advantage of having only a single grinding and lapping operation for each core holder would still apply. The advantage of a structure such as this is evident when compared with the structure shown and described in the previously mentioned Paul S. Michael application.

The same concepts can be utilized in constructing a monaural head. In such case, one core holder would contain a single U-shaped core piece forming a major portion of the R/P circuit, while the other core holder would contain the second U-shaped core piece and the center leg core piece forming the erase circuit. The same advantages of construction and operation would accrue.

A further advantage of the present invention lies in using a single erase coil to provide erase flux for the two erase circuits in each stereo head as well as bias flux for the two recording circuits. Prior to the present invention, a separate erase coil has been used for each circuit. The single bobbin used to support the single erase coil also acts to hold the center leg core pieces in position. Further, only two electrical contact pins are required whereas four were required in prior constructions. Of course, individual erase coils for each erase circuit of the stereo head could be used for the purpose of erase selectivity.

The present invention thus provides several new concepts useful in constructing magnetic transducers. Transducers according to the present invention can be constructed at a lower cost than functionally comparable systems constructed according to prior art practice. Further, no other known single composite structure will yield the functions demanded by a two or more channel bidirectional recording application.

I claim:

1. A magnetic transducer, comprising:

a. first and second identically constructed core holders each having an open face defined by the edges of a top wall and a pair of opposite side walls having at least a pair of edge portions lying in a first plane, said top wall having first and second slots of predetermined width formed therein a predetermined distance apart;

b. a plurality of generally U-shaped core pieces fixedly mounted in each of said core holders, each of said core pieces having a base leg portion terminating in an end, a side leg portion, and a top leg portion terminating in a core tip, said base and top leg portions extending toward said open face of said associated core holder;

c. each of said core holders having a first pair of core pieces mounted with their top leg portions positioned with in said first slot and with their core tips terminating in a coplanar relationship in said first plane;

d. first spacer means mounted between said first pair of core pieces to space said core tips a predetermined distance apart;

e. each of said core holders having a second pair of core pieces mounted with their top leg portions positioned within said second slot and with their core tips and ends of their base leg portions terminating a predetermined distance below said first plane;

f. each of said core holders having a pair of center leg core pieces fixedly mounted therein, each of said center leg core pieces having a top portion thereof positioned within said second slot adjacent a corresponding core tip of one of said second pair of core pieces so as to form an erase gap therebetween, and a bottom portion thereof positioned against the end of the base leg portion of the same core piece, the upper surface of at least the top and bottom portions of each of said center leg core pieces lying in said first plane;

g. second spacer means mounted between said second pair of core pieces and between said pair of center leg core pieces to hold the core tips and top portions a predetermined distance apart;

h. erase coil means mounted on said second part of core pieces;

i. record/playback coil means mounted on said first pair of core pieces; and j. means including housing means for holding said first and second core holders in a face-to-face relationship to place the first pair of core pieces in each core holder in line with the pair of center leg core pieces and the second pair of core pieces in the other core holder, to thereby provide two oppositely oriented stereo heads each capable of alternatively erasing and recording or playing back signals on a multitrack magnetic tape, each of said stereo heads having a pair of recording gaps formed between the core tips of said first pair of core pieces and the upper surfaces of the top portions of said pair of center leg core pieces, said recording gaps all lying in said first plane.

2. The apparatus of claim 1 wherein said first and second slots each have opposite side edges and are equal in size, said first and second spacer means having a predetermined thickness such that the pair of core pieces in each slot are forced apart by said spacer means to rest tightly against the opposite side edges of said slots to thereby aid in accurately positioning said core pieces with respect to said core holder and each other.

3. The apparatus of claim 1 wherein a single erase coil is mounted around both of said second pair of core pieces in each of said core holders, each of said erase coils providing a high frequency flux for the erase gaps and a bias flux for the recording gaps of one stereo head when energized.

4. A magnetic transducer, comprising:

a. first and second core holders each having an open face;

b. a plurality of generally U-shaped core pieces fixedly mounted in each of said core holders, each of said core pieces having a base leg portion, a side leg portion, and a top leg portion terminating in a core tip, said base and top leg portions extending toward said open face of said associated core holder;

c. each of said core holders having a first pair of core pieces mounted therein with their core tips terminating in a first plane;

d. first means to space said core tips of said first pair of core pieces a predetermined distance apart;

e. each of said core holders having a second pair of core pieces mounted therein with their core tips and ends of their base leg portions terminating a predetermined distance below said first plane;

f. each of said core holders having a pair of center leg core pieces fixedly mounted therein, each of said center leg core pieces having a top portion thereof positioned adjacent a corresponding core tip of one of said second pair of core pieces so as to form an erase gap therebetween, and a bottom portion thereof positioned against the end of the base leg portion of the same core piece, the upper surface of at least the top and bottom portions of each of said center leg core pieces lying in said first plane;

g. second means to hold the core tips of said second pair of core pieces a predetermined distance apart;

h. erase coil means mounted on said second pair of core pieces;

i. record/playback coil means mounted on said first pair of core pieces; and j. means including housing means for holding said first and second core holders in a face-to-face relationship to place the first pair of core pieces in each core holder in line with the pair of center leg core pieces and the second pair of core pieces in the other core holder to thereby provide two oppositely oriented stereo heads each capable of alternatively erasing and recording or playing back signals on a multitrack magnetic tape, each of said stereo heads having a pair of recording gaps formed between the core tips of said first pair of core pieces and the top portions of said pair of center leg core pieces, said recording gaps all lying in said first plane.

5. The apparatus of claim 4 wherein a single erase coil is mounted around both of said second pair of core pieces in each of said core holders.

6. The apparatus of claim 4 wherein said first and second core holders each have a pair of sidewalls and a top wall defining said open face, wherein said top wall is provided with a pair of slots, said top leg portions of said first pair of core pieces being mounted within said first slot, said top leg portions of said second pair of core pieces being mounted within said second slot, said top portion of each center leg core piece being mounted within said second slot, and wherein said first and second means are spacer means to force said core pieces apart and against the opposite edges of said slots to aid in accurately aligning the core pieces with respect to the core holder and each other.

7. The apparatus of claim 6 wherein said first spacer means includes magnetically permeable shield means mounted between said first pair of core pieces in each core holder and a nonmagnetic foil member mounted between each of said core pieces and said shield means.

8. A transducer comprising:

a. first and second core holders each having an open face defined by the edges of a pair of sidewalls and the edge of a top wall, at least a portion of said edges lying in a first plane;

b. a pair of generally U-shaped core pieces fixedly mounted in each of said core holders, each of said core pieces having a base leg portion, a side leg portion, and a top leg portion terminating in a core tip, said base and top leg portions extending toward said open face of said associated core holder;

c. each of said core holders having a first core piece mounted therein with its core tip terminating in said first plane;

d. each of said core holders having a second core piece mounted therein with its core tip and the end of its base leg portion terminating a predetermined distance below said first plane;

e. each of said core holders having a center leg core piece mounted therein, said center leg core piece having a top portion thereof positioned adjacent said core tip of said second core piece so as to form an erase gap therebetween, and a bottom portion thereof positioned against the end of the base leg portion of the same core piece, the upper surface of at least the top and bottom portions of said center leg core piece lying in said first plane;

f. erase coil means mounted on said second core piece;

g. record/playback coil means mounted on said first core piece; and h. means for holding said first and second core holders in a face-to-face relationship to place the first core piece in each core holder in line with the center leg core piece and the second core piece in the other core holder to thereby provide two oppositely oriented heads each capable of alternatively erasing and recording or playing back signals on a magnetic tape, each of said heads having a recording gap formed between the core tip of said first core piece and the top portion of said center leg core piece, said recording gaps both lying in said first plane.

9. The apparatus of claim 8 wherein a pair of slots, open to said edge, are formed in said top wall of each core holder, said first core piece being positioned within one of said slots, said second core piece and said top portion of the center leg core piece being positioned within said other slot, and wherein means including said slots are provided to accurately position said core pieces with respect to said core holders and each other.

10. A dual-track magnetic transducer, comprising:

a. first and second core holders each having an open face defined by the edges of a pair of sidewalls and a top wall, at least a portion of said edges lying in a first plane;

b. a plurality of core pieces fixedly mounted in each of said core holders, each of said core pieces having a base leg portion, a side leg portion, and a top leg portion terminating in a core tip, said base and top leg portions extending toward said open face of said associated core holder;

c. said first core holder having a first pair of spaced core pieces mounted therein with their core tips terminating in said first plane;

d. said second core holder having a second pair of equally spaced core pieces mounted therein with their core tips and ends of their base leg portions terminating a predetermined distance below said first plane;

e. said second core holder having a pair of center leg core pieces fixedly mounted therein, each of said center leg core pieces having a top portion thereof positioned adjacent a corresponding core tip of one of said second pair of core pieces so as to form an erase gap therebetween, and a bottom portion thereof positioned against the end of the base leg portion of the same core piece, the upper surface of at least the top and bottom portions of each of said center leg core pieces lying in said first plane;

f. erase coil means mounted on said second pair of core pieces;

g. record/playback coil means mounted on said first pair of core pieces; and h. means including housing means for holding said first and second core holders in a face-to-face relationship to place the first pair of core pieces in line with the pair of center leg core pieces in the other core holder to thereby provide a two channel head capable of alternatively erasing and recording or playing back signals on a multitrack magnetic tape, said head having a pair of recording gaps formed between the core tips of said first pair of core pieces and the top portions of said pair of center leg core pieces, said recording gaps both lying in said first plane.

11. The apparatus of claim 10 wherein a single erase coil is mounted around both of said second pair of core pieces.

12. The apparatus of claim 10 wherein a slot of predetermined size is formed in said top wall of each core holder, said edge of said top wall lying in said first plane, said slot extending downwardly from said edge, wherein the top leg portions of said first pair of core pieces are positioned in said slot in said first core holder, wherein said top leg portions of said second pair of core pieces and said top portions of said center leg core pieces are positioned in said slot in said second core holder, and wherein spacer means are mounted between the core pieces in each slot to force them apart and against the side edges of said slot to provide accurate track spacing.

13. A magnetic transducer, comprising:

a. first and second core holders each having an open face defined by the edges of a pair of sidewalls and a top wall, at least a portion of said edges lying in a first plane;
b. a generally U-shaped core piece fixedly mounted in each of said core holders, said core pieces each having a base leg portion, a side leg portion, and a top leg portion terminating in a core tip, said base and top leg portions extending toward said open face of said associated core holder;
c. said first core holder having said first core piece mounted therein with its core tip terminating in said first plane;
d. said second core holder having said second core piece mounted therein with its core tip and the end of its base leg portion terminating a predetermined distance below said first plane;
e. said second core holder having a center leg core piece fixedly mounted therein, said center leg core piece having a top portion thereof positioned adjacent the core tip of said second core piece so as to form an erase gap therebetween, and a bottom portion thereof positioned against the end of the base leg portion of said second core piece, the upper surface of at least the top and bottom portions of said center leg core piece lying in said first plane;
f. erase coil means mounted on said second core piece;
g. record/playback coil means mounted on said first core piece; and
h. means for holding said first and second core holders in a face-to-face relationship to place the first core piece in line with the center leg core piece in the other core holder to thereby provide a head capable of alternatively erasing and recording or playing back signals on a magnetic tape, said head having a recording gap formed between the core tip of said first core piece and the top portion of said center leg core piece, said recording gap lying in said first plane.

14. A magnetic transducer having first and second oppositely oriented, spaced heads, each of said heads comprising a magnetic circuit capable of alternatively erasing and recording or playing back signals on a magnetic tape, each of said magnetic circuits being formed from a plurality of core pieces including two outer leg core pieces and a common center leg core piece, gap spacer means mounted between said outer leg core pieces and said common center leg core piece to form erase and record/playback gaps for each circuit, erase and record/playback coils mounted on said core pieces, said core pieces being mounted in said transducer with said center leg core pieces lying on opposite sides of a plane extending transversely through both said heads, with said record/playback gaps lying in said plane and with said erase gaps positioned on opposite sides thereof, said core pieces and coils being mounted in a pair of core holders, each of said core holders carrying all of the structure located on one side of said plane, and means for holding said pair of core holders in a face-to-face relationship to form said transducer.

15. A magnetic transducer for alternatively erasing and recording or playing back signals on a magnetic tape, comprising:

a. a housing;
b. a pair of generally U-shaped core pieces fixedly mounted in said housing, said core pieces being oppositely disposed, each of said core pieces having a base leg portion, a side leg portion and a top leg portion terminating in a core tip;
c. a center leg core piece mounted between said oppositely disposed core pieces with a top portion thereof extending between said core tips and a bottom portion thereof abutting the ends of said base leg portions to form erase and record/playback circuits;
d. gap spacer means mounted between each core tip and said center leg core piece to form erase and record/playback gaps;
e. erase coil means mounted on the U-shaped core piece forming the major portion of the erase circuit;
f. recording/playback coil means mounted on said other U-shaped core piece;
g. said center leg core piece having one side thereof lying in a single plane, said plane extending through said record/playback gap; and
h. said housing comprising a pair of adjoining core holders, each of said core holders having securely mounted therein all of the structure located on one side of said plane.